US012661644B2

(12) United States Patent
Kim et al.

(10) Patent No.: US 12,661,644 B2
(45) Date of Patent: Jun. 23, 2026

(54) PIPETTE TIP AND PIPETTE SYSTEM FOR CAPILLARY BLOOD COLLECTION

(71) Applicant: I-SENS, INC., Seoul (KR)

(72) Inventors: Kyungho Kim, Seoul (KR); Yungjoon Jin, Seoul (KR); Yu Sung Kim, Seoul (KR); Hakhyun Nam, Seoul (KR)

(73) Assignee: I-SENS, INC., Seoul (KR)

( * ) Notice: Subject to any disclaimer, the term of this patent is extended or adjusted under 35 U.S.C. 154(b) by 640 days.

(21) Appl. No.: 18/007,089

(22) PCT Filed: Jun. 1, 2021

(86) PCT No.: PCT/KR2021/006800
§ 371 (c)(1),
(2) Date: Jan. 27, 2023

(87) PCT Pub. No.: WO2022/025405
PCT Pub. Date: Feb. 3, 2022

(65) Prior Publication Data

US 2023/0264185 A1 Aug. 24, 2023

(30) Foreign Application Priority Data

Jul. 29, 2020 (KR) ........................ 10-2020-0094335

(51) Int. Cl.
*B01L 3/02* (2006.01)

(52) U.S. Cl.
CPC ............ *B01L 3/022* (2013.01); *B01L 3/0275* (2013.01); *B01L 2200/04* (2013.01);
(Continued)

(58) Field of Classification Search
None
See application file for complete search history.

(56) References Cited

U.S. PATENT DOCUMENTS 5,364,533 A * 11/1994 Ogura .................... A61B 5/154
210/504
5,556,598 A * 9/1996 Raybuck ................ B01J 20/321
435/308.1
(Continued)

FOREIGN PATENT DOCUMENTS

EP 2103680 A1 9/2009
JP 10-019741 A 1/1998
(Continued)

OTHER PUBLICATIONS

International Search Report and Written Opinion for PCT/KR2021/006800 (ISA/KR) dated Nov. 1, 2021 w/English translation (9 pages).
(Continued)

*Primary Examiner* — Brian R Gordon
(74) *Attorney, Agent, or Firm* — ALSTON & BIRD LLP

(57) ABSTRACT

The capillary blood pipette tip system of the present invention includes a pipette tip for collecting capillary blood including a sampling unit having a capillary tube having a first diameter so as to sample a capillary blood; a sample storage unit having a first extension end formed from a distal end of the capillary tube of the sampling unit so as to have a larger area than the sampling unit; a sealing unit closely adhered to a distal opening of the sample storage unit and broken by a quantitative syringe introduced from the outside; a shielding wall surrounding the sealing unit to prevent the sample from splashing from the sample storage unit to the outside when the sealing unit is broken by the quantitative syringe; and a handle unit which is held by a user to sample using the sampling unit; an immunoassay cartridge having at least one pipette tip mounting well having a plunger that presses a sample of a sampling unit of the pipette tip from the bottom to the top when the pipette tip is coupled to the top; and a quantitative syringe for quantita-
(Continued)

tively sampling the capillary blood collected in the upper part thereof by approaching through the upper part of the pipette tip, when the capillary blood from the sampling unit is collected in the upper part by the pressurization of the plunger during the coupling of the pipette tip to the immunoassay cartridge.

15 Claims, 14 Drawing Sheets

(52) U.S. Cl.
CPC .................. *B01L 2300/0681* (2013.01); *B01L 2300/0838* (2013.01); *B01L 2400/0406* (2013.01); *B01L 2400/0478* (2013.01)

(56) References Cited

U.S. PATENT DOCUMENTS

| | | | | |
|---|---|---|---|---|
| 6,117,394 | A * | 9/2000 | Smith | B01L 3/0275 73/864.03 |
| 6,482,362 | B1 * | 11/2002 | Smith | B01L 3/0275 73/864.03 |
| 8,133,454 | B2 * | 3/2012 | Tajima | B01L 3/0275 422/50 |
| 8,263,390 | B2 * | 9/2012 | Tajima | B01L 3/0275 422/525 |
| 8,336,403 | B2 * | 12/2012 | Tajima | B01L 3/0275 73/864.11 |
| 8,425,860 | B2 * | 4/2013 | Tajima | B01L 3/0275 422/50 |
| 10,730,043 | B2 * | 8/2020 | Iwasawa | A61B 5/150343 |
| 2004/0182788 | A1 * | 9/2004 | Dorian | B01L 3/5635 210/416.1 |
| 2008/0193995 | A1 * | 8/2008 | Tajima | B01L 3/502 435/174 |
| 2008/0257073 | A1 * | 10/2008 | Tajima | B01L 3/0275 73/864.11 |
| 2010/0043575 | A1 * | 2/2010 | Tajima | B01L 3/0275 73/864.11 |
| 2010/0081209 | A1 * | 4/2010 | Brewer | B01L 3/0275 436/178 |
| 2012/0164750 | A1 * | 6/2012 | Gjerde | G01N 1/405 436/178 |
| 2015/0151035 | A1 * | 6/2015 | Huemer | B01L 3/5635 210/321.6 |
| 2015/0153323 | A1 * | 6/2015 | Huemer | B01L 3/502723 422/534 |
| 2015/0210437 | A1 * | 7/2015 | Tajima | B01L 3/0275 222/1 |
| 2015/0211967 | A1 * | 7/2015 | Gooley | G01N 1/405 435/309.1 |
| 2017/0059550 | A1 | 3/2017 | Bokka Srinivasa Rao et al. | |
| 2022/0184600 | A1 * | 6/2022 | Kowalewski | G01N 33/491 |
| 2023/0364314 | A1 * | 11/2023 | Nishi | A61B 5/150755 |

FOREIGN PATENT DOCUMENTS

| | | | |
|---|---|---|---|
| JP | 2008-020255 | A | 1/2008 |
| JP | 5301287 | B2 | 9/2013 |
| JP | 6104480 | B2 | 4/2017 |
| KR | 10-2123499 | B1 | 6/2020 |
| WO | WO 1981/000913 | A1 | 4/1981 |
| WO | WO 2014/026008 | A1 | 2/2014 |
| WO | WO 2018/079884 | A1 | 5/2018 |

OTHER PUBLICATIONS

Extended European Search Report for EP Patent Application No. 21848589.4 dated Jun. 17, 2024 (9 pages).

* cited by examiner

PIPETTE TIP AND PIPETTE SYSTEM FOR CAPILLARY BLOOD COLLECTION

CROSS-REFERENCE TO RELATED APPLICATIONS

The present application is a national phase entry of International Application No. PCT/KR2021/006800, filed Jun. 1, 2021, which claims priority to Korean Patent Application No. 10-2020-0094335, filed Jul. 29, 2020, which are incorporated herein by reference in their entirety.

TECHNICAL FIELD

The present invention relates to a pipette tip and a pipette system for collecting capillary blood, more particularly, relates to a pipette tip for collecting capillary blood and a pipette system, capable of securing a sufficient plasma amount required for immunoassay, satisfying various collection sample amounts required for immunoassay with one pipette tip, reducing errors in immunoassay by providing a sufficient reaction amount, and moving without contamination for immunoassay when necessary.

BACKGROUND ART

The immunoassay equipment measures the concentration of a specific biomarker protein in the plasma or serum of a person, and may use venous blood extracted from the arm of a person in case of cardiovascular disease as a measurement sample and capillary blood extracted from the tip of a person in case of diabetes and infectious virus measurement as a measurement sample.

When venous blood is used, 5 mL or more of blood for measurement should be sampled even though the amount of blood to be actually used is sufficient only in tens to hundreds of μL, and there are problems in that automatic sampling is possible only when several mL of blood are contained in a blood tube in an automated device, in the case of infants and patients who have difficulty in collecting blood due to deep blood vessels, there are psychological distress of collecting blood and difficulty in collecting blood itself, it is difficult to collect an appropriate sample amount unless they are skilled, and convenience of use decreases.

Meanwhile, when capillary blood is used, the user may collect blood using a finger tip only as much as the amount of blood actually used for measurement, but it is difficult to check whether the amount of collected blood is as much as desired, and since the user does not know how much the amount of blood collected by the finger tip is, it is difficult to accurately discharge a sample amount to a desired position of a cartridge well.

As described above, even when capillary blood is used, the finger tips should be used separately according to the amount of blood required, and there is a problem in that an appropriate amount of samples is not guaranteed when centrifuging to obtain plasma, and accordingly, there is a problem in that an accurate result value cannot be provided.

Further, in the immunoassay equipment, it is difficult to stably and simply couple the pipette tip for collecting capillary blood to the cartridge when loading/unloading the syringe quantitative tip.

In addition, in the case of the conventional pipette tip for collecting capillary blood, there is a problem in that a sample used when being mounted on a cartridge is contaminated or equipment is contaminated by the sample.

As shown in FIG. 13, International Patent Publication WO 2018/079884 A1 discloses a pipette tip structure including a barrel body in which a sample storage chamber having a discontinuous end having an inclination angle of 45 degrees or more with respect to a capillary tube is formed in order to solve a problem in which it is difficult to mount a sample on a cartridge because capillary tube becomes so long in order to collect an appropriate amount of sample.

As shown in FIG. 14, the pipette tip structure of International Patent Publication WO 2018/079884 A1 uses a dedicated tip having an appropriate dose or different types of tips having different capillary structures according to the blood volume (10 uL, 30 μL, 50 uL) to be collected, since the sample amounts to use are different according to test types, such as 10 uL for diabetes such as HbA1c, 30 uL for PCT sepsis, and 50 uL for CRP inflammation levels.

That is, in the case of using capillary blood, it is impossible to extract an appropriate amount of plasma required for various immunoassays, and when the desired sample amount is properly sampled and coupled to a cartridge of an immunoassay device, there are still problems of specimen contamination and surrounding contamination, and it is difficult to couple to the cartridge.

DISCLOSURE

Technical Problem

The present invention has been made in an effort to provide a pipette tip and a pipette system for collecting capillary blood capable of guaranteeing a desired collection amount of blood and accurately discharging a collected sample to remove an error of measurement.

An exemplary embodiment of the present invention provides a pipette tip and a pipette system for collecting capillary blood capable of improving the accuracy of measurement by installing a membrane filter in a pipette tip for collecting capillary blood so that, when the pipette tip is mounted on a cartridge, plasma in blood is separated by the membrane filter by a plunger in a cartridge well, and thus, the plasma may be used by a quantitative suction in an immunoassay device.

Another embodiment of the present invention provides a pipette tip and a pipette system for collecting capillary blood capable of providing convenience and simplicity of use by easily sampling capillary blood using the capillary blood even by an unskilled user.

Yet another embodiment of the present invention provides a pipette tip and a pipette system for collecting capillary blood that can be used in various tests with a single pipette tip because various sample amounts can be covered with the single capillary pipette tip even if a desired amount of blood sample is changed.

Still another embodiment of the present invention provides a pipette tip and a pipette system for collecting capillary blood, which allow easy cartridge mounting and separation, can provide a structure allowing easy storage and movement by sealing an aluminum thin film and a storage tube thermally fused to the upper end of a sample collecting unit when mounting in a storage tube, and can enable a quantitative analysis to be performed by a quantitative syringe in an immunoassay device through the aluminum thin film.

Technical Solution

A pipette tip for collecting capillary blood according to an exemplary embodiment of the present invention includes: a sampling unit having a capillary tube with a first diameter for sampling capillary blood; a sample storage unit having a first extension end formed from the end of the capillary tube of the sampling unit so as to have a larger area than the sampling unit; a sealing unit closely adhered to a distal opening of the sample storage unit so as to be broken by a quantitative syringe introduced from the outside; and a handle unit having a shielding wall surrounding the circumference of the sealing unit so as to prevent the sample from splashing from the sample storage unit to the outside when the sealing unit is broken by the quantitative syringe, and which is held by a user so as for sampling a sample by using the sampling unit.

The pipette tip for collecting capillary blood according to a modified exemplary embodiment of the present invention may further include a filter unit accommodated in a front end of the sample storage unit, absorbing and storing the capillary blood along a first extension end of the sampling unit, separating the capillary blood into red blood cells and plasma when being pressurized through a front end opening of the sampling unit, and storing the plasma in the sample storage unit.

The sample storage unit may include: a tubular body; an air-discharge hole which is formed on the upper side of the body and from which air is discharged when the sealing unit is broken; and an insertion-fitting and coupling unit for insertion-fitting coupling with respect to a cartridge for immunoassay or a storage tube for accommodating the sampling unit and the sample storage unit along the outer circumferential part of the upper end of the body.

The filter unit may include a porous membrane for separating the red blood cells and the plasma by a pressure equal to or greater than a predetermined pressure, and an upper surface of the filter unit may be treated so that the sample stored in the sample storage chamber may not move downward by gravity.

The sample storage unit may have a second diameter larger than the first diameter of the capillary tube and a length of 50% to 80% of the length of the capillary tube, the second diameter may facilitate the movement of the quantitative syringe, and the sealing unit may be made of aluminum foil and coupled to the bottom of the sample storage chamber by thermal fusion. The storage tube may include: a tube main body having one end blocked, the tube main body accommodating the sampling unit and the sample storage unit; an inner circumferential insertion-fitting and coupling unit formed in an inner circumferential part of the tube main body in order to insertion-fitting couple the tube main body with respect to a lower part of a handle unit of the pipette tip; and a support flange supporting a second extension end of the handle unit.

According to another embodiment of the present invention, the capillary blood pipette tip system may include: a pipette tip for collecting capillary blood, including a sampling unit having a capillary tube having a first diameter so as to sample a capillary blood, a sample storage unit having a first extension end formed from a distal end of the capillary tube of the sampling unit so as to have a larger area than the sampling unit, a sealing unit closely adhered to a distal opening of the sample storage unit and broken by a quantitative syringe introduced from the outside, a shielding wall surrounding the sealing unit to prevent the sample from splashing from the sample storage unit to the outside when the sealing unit is broken by the quantitative syringe, and a handle unit which is held by a user to sample using the sampling unit; an immunoassay cartridge having at least one pipette tip mounting well having a plunger that presses a sample of a sampling unit of the pipette tip from the bottom to the top when the pipette tip is coupled to the top; and a quantitative syringe for quantitatively sampling the capillary blood collected in the upper part thereof by approaching through the upper part of the pipette tip, when the capillary blood from the sampling unit is collected in the upper part by the pressurization of the plunger during the coupling of the pipette tip to the immunoassay cartridge.

The modified capillary blood pipette tip system according to another embodiment of the present invention may further include a filter unit accommodated in a front end of the sample storage unit, absorbing and storing the capillary blood along a first extension end of the sampling unit, separating the capillary blood into red blood cells and plasma when being pressurized through a front end opening of the sampling unit, and storing the plasma in the sample storage unit.

The storage tube may include a label unit provided on an outer wall of a tube body in a form of a barcode, the plunger may integrally protrude from a bottom of the pipette tip mounting well in a form of a bar or a rod, the plunger may include a bar or a rod and a support plate formed at a lower part of the bar or the rod, the plunger may be detachably installed at the bottom of the pipette tip mounting well, and a length of the bar or the rod may be variable.

Advantageous Effects

A pipette tip and a pipette system for collecting capillary blood according to an exemplary embodiment of the present invention can guarantee a desired collection amount of blood and can accurately discharge a collected sample, thereby removing an error of measurement.

Further, in the pipette tip and a pipette system for collecting capillary blood according to an exemplary embodiment of the present invention, when the pipette tip is mounted on a cartridge, even a small amount of blood in a sampling unit is pressed by a plunger in a cartridge well so that a quantitative amount of blood may be sucked in from the immunoassay device and used, thereby minimizing a sample collecting volume error, and performing a quantitative suction operation by using a syringe pump, thereby improving measurement accuracy.

In addition, a pipette tip for collecting capillary blood and a pipette system according to an exemplary embodiment of the present invention may improve the accuracy of measurement by installing a membrane filter in the pipette tip for collecting capillary blood so that, when the pipette tip is mounted in a cartridge, plasma in blood is separated by the membrane filter by a plunger in a cartridge well, and thus, the plasma may be used by a quantitative suction in an immunoassay device.

A pipette tip and a pipette system for collecting capillary blood according to an exemplary embodiment of the present invention may provide convenience and convenience of use by easily sampling capillary blood using the capillary blood even by an unskilled user.

Further, a pipette tip and a pipette system for collecting capillary blood according to an exemplary embodiment of the present invention may cover various sample amounts with one capillary blood pipette tip even if a desired blood sample amount is changed, and thus one pipette tip may be used for various tests.

A pipette tip and a pipette system for collecting capillary blood according to an exemplary embodiment of the present invention may allow a cartridge to be easily mounted and detached, may provide a structure facilitating storage and movement by sealing an aluminum thin film and a storage tube thermally fused to the upper end of a sample collecting unit when being mounted on the storage tube, and may perform quantitative analysis by a quantitative syringe in an immunoassay device through the aluminum thin film.

MODE FOR INVENTION

Figure 1:
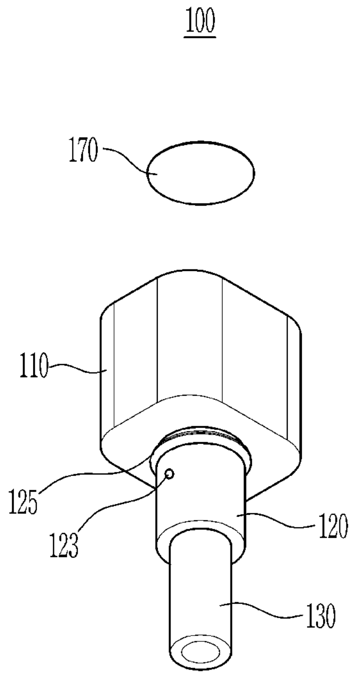
FIG. 1 is a perspective view of a pipette tip for collecting capillary blood according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when a part "includes" a component, this means that other components may be further included, rather than excluding other components, unless specifically stated otherwise.

Hereinafter, a pipette tip and a pipette system for collecting capillary blood according to an exemplary embodiment of the present invention will be described in detail with reference to the accompanying drawings.

Figure 2:
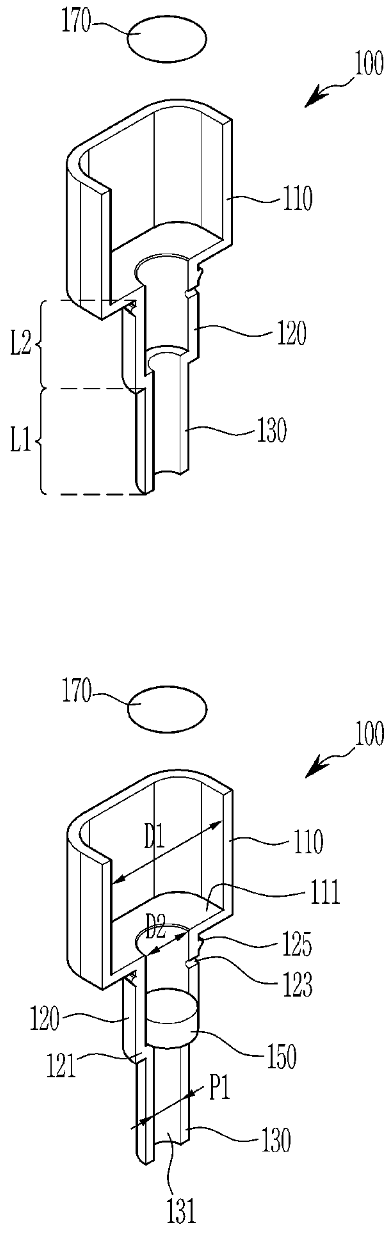
FIG. 2 is a cut-away perspective view of the pipette tip for collecting capillary blood cut along line I-I of FIG. 1.

As shown in FIGS. 1 and 2A, a pipette tip 100 for collecting capillary blood according to an exemplary embodiment of the present invention includes a handle unit 110, a sample storage unit 120, a sampling unit 130, and a sealing unit 170.

The handle unit 110, the sample storage unit 120, and the sampling unit 130 may be integrally formed with each other, may be made of glass or plastic, may be preferably made of a transparent material, and may be preferably made of a material having high rigidity so as not to cause a shape change due to an external force.

The sampling unit 130 includes a long capillary tube 131 formed in a longitudinal direction thereof to introduce a sample, and the capillary tube 131 may be made of a hydrophilic material for an effective capillary phenomenon or an inner circumferential surface of the capillary tube 131 may be coated with a hydrophilic thin film.

The capillary tube 131 is formed to penetrate the sampling unit 130 in the longitudinal direction thereof, and stores the sample, that is, the capillary blood, by a capillary phenomenon, such that it is preferably anticoagulated, and the sampling capacity may be about 5 μl to 100 μl.

The diameter P1 of the capillary tube 131 may be determined within a range in which a sample may be sampled by a capillary phenomenon, and may be preferably determined at about 0.5 mm to 1.5 mm to maximize a capillary phenomenon of the capillary tube 131.

Meanwhile, in the present invention, the cross-sectional shape of the capillary may be variously modified in consideration of the sampling capacity. For example, in order to increase the sampling capacity, the length L1 of the sampling unit 130 should be increased, but in the present invention, the size of the cross-section of the capillary tube may be increased for a large sampling capacity.

In the pipette tip 100 according to an exemplary embodiment of the present invention, a sufficient sampling capacity required may be determined by the volume of the capillary tube 131 of the sampling unit 130. That is, the volume of the capillary tube 131 is determined by the cross-sectional area and the length L1 of the capillary tube 131, and the sampled sample fills the capillary tube 131 below the extension end 121 by a capillary phenomenon. The sample storage unit 120 has a hollow tubular shape, and forms a sample storage chamber 122 which communicates with the capillary tube 111 with a first extension end 121 discontinuously extending therefrom to store a sample, and has a second diameter D2 larger than the first diameter D1 of the capillary tube 131.

Although the second diameter D2 is larger than the first diameter D1 of the capillary tube 131, the quantitative syringe 1 may be freely moved up and down and the length L2 of 50% to 80% of the length L1 of the capillary tube 131 may be preferably set to have a predetermined height with respect to a minimum sample amount of 5 μl so that the sample moved from the capillary tube 131 to the sample storage unit 120 by the quantitative syringe 1 may be easily sampled.

Although the first extension end 121 has a right angle with respect to the capillary tube 131, it can be confirmed that when the inclination angle θ is 45° or more, the capillary tube 131 is filled with a liquid sample sampled by a capillary phenomenon, and the inclination angle θ may be 90° or more.

In Table 1, it was tested whether each of the 100 pipette tips 100 according to an exemplary embodiment of the present invention is filled into the sample storage unit 120 by passing through the capillary tube 131 and the first extension end 121 by varying the inclination angle θ of the first extension end 121.

95 or more of the 100 pipette tips 100 are marked as being good when the sample storage chamber 122 is filled with the capillary blood by passing through the capillary tube 131 and the first extension end 121.

TABLE 1

| 45°-90° | 90° | 90°-135° |
|---|---|---|
| Good | Good | Good |

The sample storage chamber 122 is formed to penetrate the center of the sample storage unit 120, and may ensure a sufficient amount of blood collection even when the capillary tube 131 is not too long due to a capillary phenomenon along the first extension end 121. As shown in FIGS. 1 and 2B, in the pipette tip 100 for collecting capillary blood according to the modified exemplary embodiment of the present invention, the sample storage chamber 122 may store the sample filtered by the filter unit 150 installed at the first extension end 121.

When the sample sampled by the capillary tube 131 is capillary blood, the filter unit 150 may filter red blood cells, platelets, and the like, and store the plasma in the sample storage chamber 122.

The filter unit 150 may have a disk shape having a second diameter D2 so as to be insertedly coupled to the sample storage chamber 122, and may serve as a stopper to restrict movement of a plunger fixed to a bottom of a cartridge well, which will be described later.

The filter unit 150 may be formed of a porous membrane that absorbs and stores the capillary blood and moves only the plasma by pressure equal to or greater than a predetermined pressure, and the top surface of the filter unit 150 may be treated so as to prevent gravity movement of the plasma stored in the sample storage chamber 122.

The handle unit 110 having the second extension end 111 formed at the upper end of the sample storage chamber 122 may be luer lock assembled to one of the immunoassay cartridge wells, and the insertion-fitting and coupling unit 125 may be formed at the outer circumferential part of the sample storage unit 120 under the second extension end 111 so as to be insertion-fitting coupled to the upper end of the cartridge well.

The handle unit 110 may have a hollow shape having a predetermined volume to allow the quantitative syringe 1 to easily approach the sample storage chamber 122 up and down, and may have a shielding wall 113 along the second extension end 111 with respect to the upper opening 122*a* of the sample storage chamber 122 so as to prevent the sample from splashing around.

A longitudinal protrusion may be formed on an outer circumferential part of the shielding wall 113 so that a user may hold the sample with a finger without slipping and collect a sample through the sampling unit 130. Once the handle unit 110 is insertion-fitting coupled to the cartridge well, the capillary blood in the capillary tube 131 may be pressed in a direction opposite to the direction of gravity by a plunger installed at the bottom of the cartridge well, thereby separating plasma from the capillary blood absorbed in the filter unit 150.

The insertion-fitting and coupling unit 125 formed on the outer circumferential part of the sample storage unit 120 under the second extension end 111 of the handle unit 110 may be a coupling protrusion coupled to a sealing cap to be described in detail below. The insertion-fitting and coupling protrusion 125 may be a leaf spring having an elastic restoring force capable of being compressed and protruding to an original state when a force is applied thereto, and may be integrally formed by being pressed and folded when the material of the sample storage unit 120 is a metal material.

In the outer circumferential part of the sample storage unit 120, an air-discharge hole 123 may be further formed under the insertion-fitting and coupling protrusion 125 to discharge air.

When the sample storage chamber 122 is filled with plasma, the air-discharge hole 123 may discharge air filled in the sample storage chamber 122 to the outside.

Meanwhile, a sealing unit 170 may be coupled to the upper opening 122*a* of the sample storage chamber 122 by thermal fusion.

Therefore, the quantitative syringe 1 may break the sealing unit 170 and then approach the sample storage chamber 122 to quantitatively dispense the sample, and in this case, since air is discharged to the outside through the air-discharge hole 123, the sample in the sample storage chamber 122 may be prevented from being severely splashed to the outside.

The sealing unit 170 may be preferably made of an aluminum foil that is thermally fused to the second extension end 111 and is crushed by the vertical movement of the quantitative syringe 1, and the aluminum foil coated with a black film may be advantageous for optical measurement and the like.

As described above, since the upper opening 122*a* of the sample storage chamber 122 is sealed by the sealing unit 170, it is possible to prevent the sample from being contaminated while moving to the immunoassay device, to prevent the sample from being contaminated even when the sample is installed in a cartridge well of the immunoassay device, and to prevent other cartridge wells from being contaminated.

When the quantitative syringe 1 of the immunoassay device passes through the sealing unit 170 in the gravity direction, the air-discharge hole 123 may discharge internal air to the outside to prevent the plasma from splashing to the outside, and also, air may be introduced into the sample storage chamber 122 from the outside to allow the quantitative syringe 1 to easily pass through the sealing unit 170 in the gravity direction. A pipette system for collecting capillary blood according to an exemplary embodiment of the present invention will be described with reference to FIGS. 3 to 7.

Figure 3:
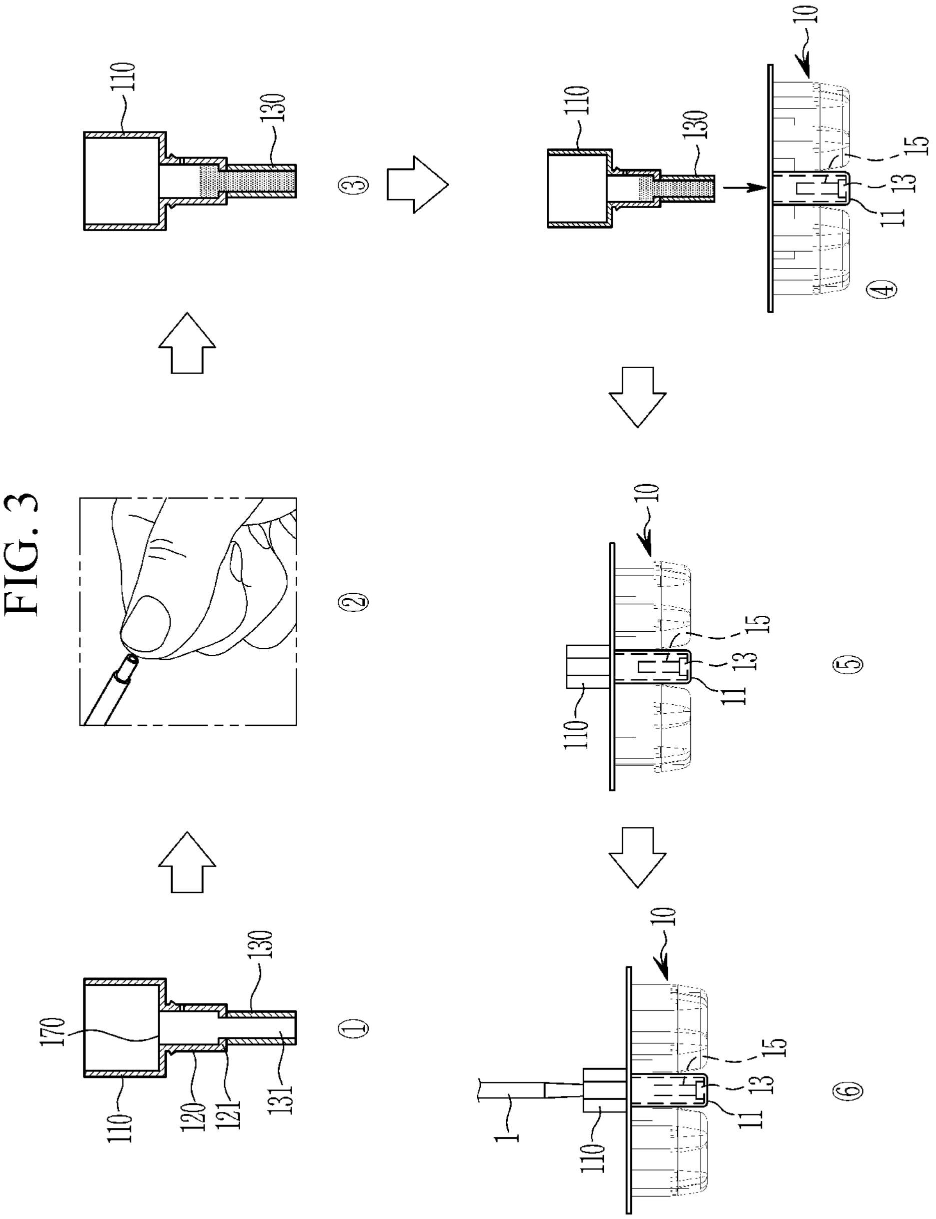
FIG. 3 is a work flowchart for describing a pipette system using a pipette tip for collecting capillary blood according to an exemplary embodiment of the present invention.

As shown in FIG. 3, a user may fill the capillary tube 131 with capillary blood by holding the handle unit 110 and pressing the finger punched with a lancet or the like by the sampling unit 130.

The capillary blood may fill the sample storage chamber 121 with a sufficient amount of the capillary blood by a capillary phenomenon along the capillary tube 131 along the first extension end 121.

When the handle unit 110 of the pipette tip 100 is held according to the exemplary embodiment of the present invention in which capillary blood is filled, and is slowly lowered in the gravity direction to the pipette tip mounting well 11 among the plurality of wells of the circular cartridge 10 to be mounted on the immunoassay device, and thus the handle unit 110 is seated and coupled at the upper part of the pipette tip mounting well 11, the capillary blood is moved sufficiently upward by the plunger 15 protruding from the support plate 13 under the pipette tip mounting well 11, the capillary blood are quantitatively sucked and centrifuged using the quantitative syringe 1 of the immunoassay device, the centrifuged plasma is transferred to the pre-treatment solution of another well, the sample (plasma) and the pre-treatment solution are mixed to prepare a mixed solution, and then, the mixed solution is sucked again using the quantitative syringe 1 to be dispensed to a desired place.

Figure 4:
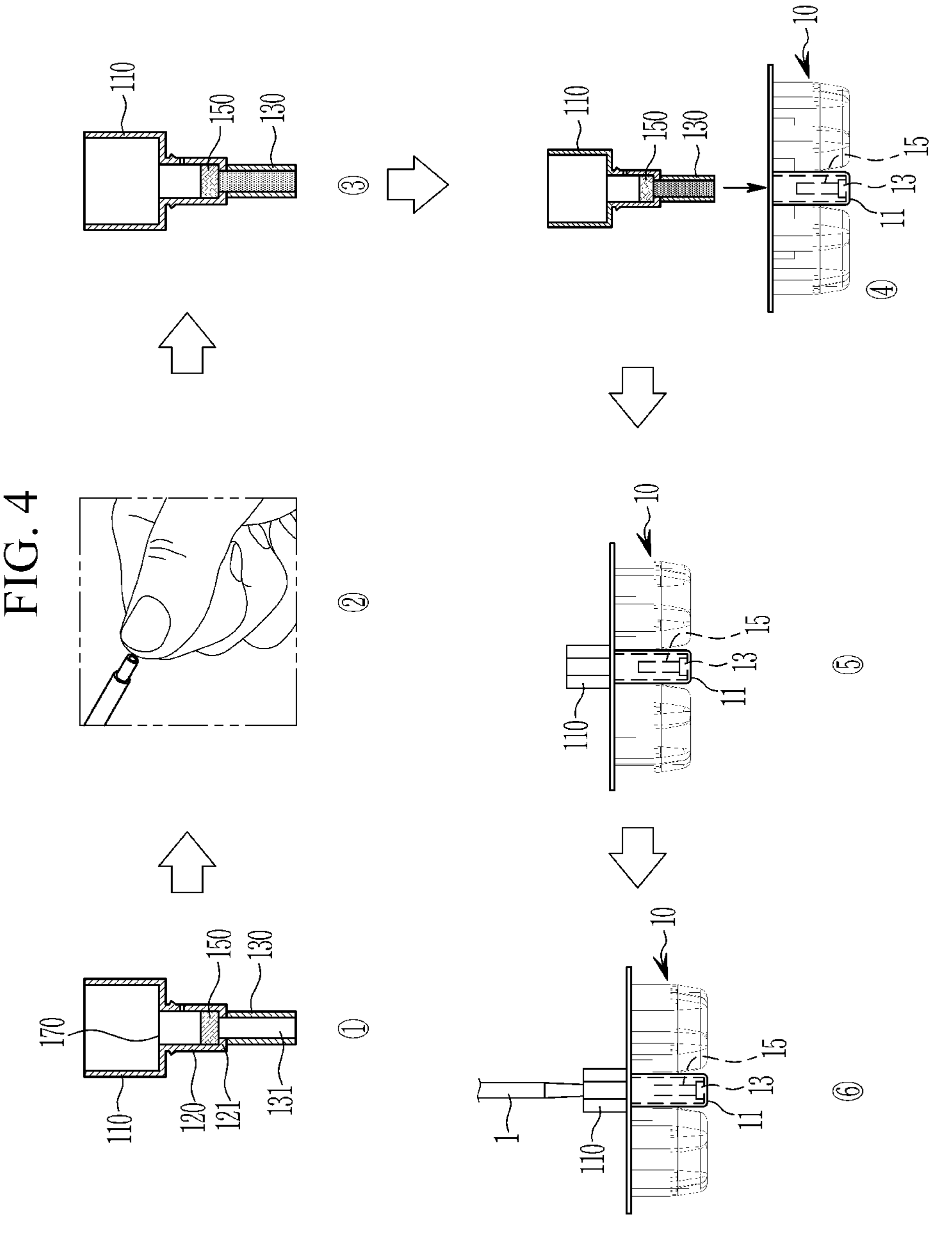
FIG. 4 is a work flowchart for describing a pipette system using a pipette tip for collecting capillary blood according to a modified exemplary embodiment of the present invention.
Figure 5:
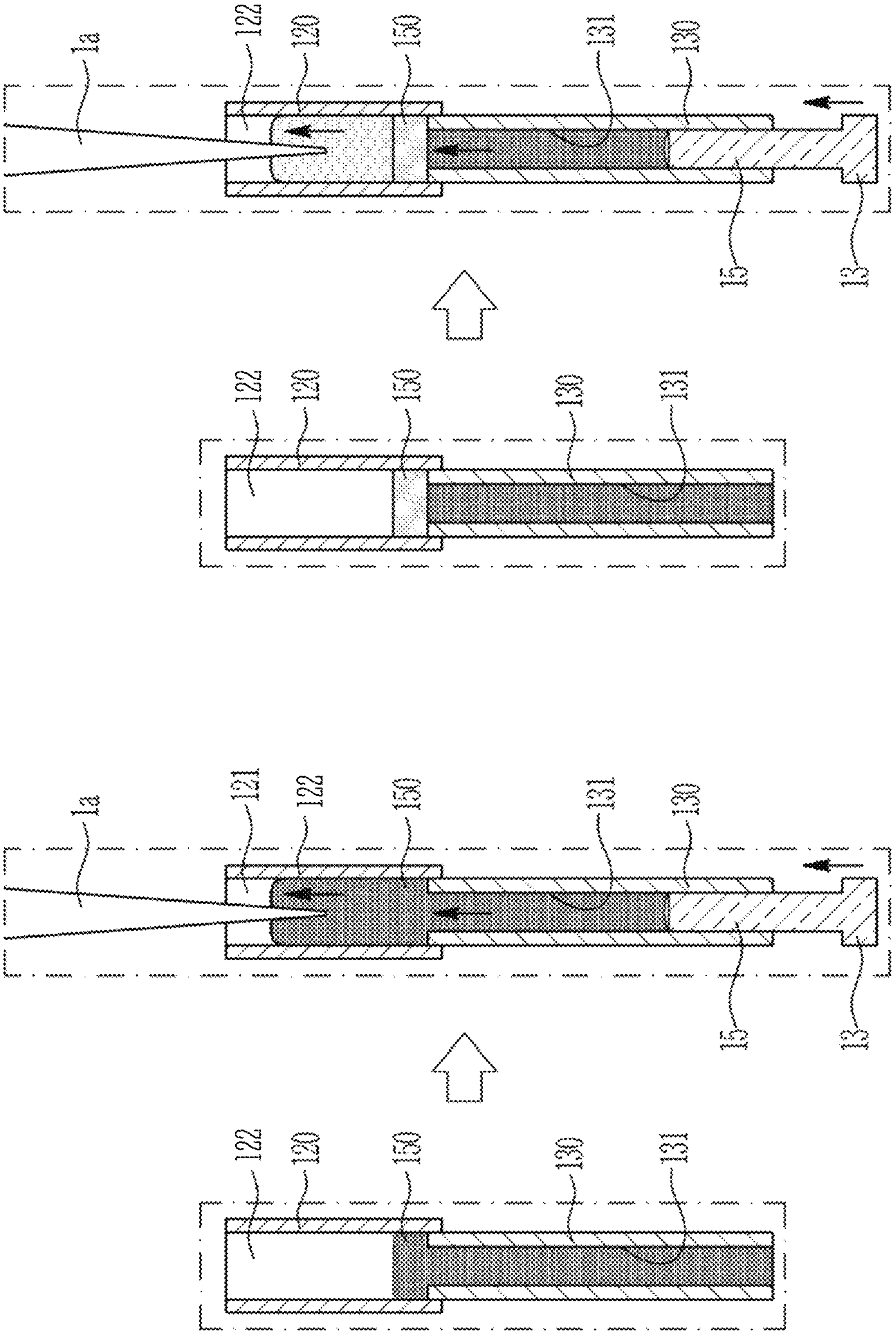
FIG. 5 is a conceptual diagram for explaining a state in which the capillary blood is collected by using a pipette tip for collecting capillary blood according to an exemplary embodiment and a modified exemplary embodiment of the present invention and a method for quantifying capillary blood with a quantitative syringe by using a plasma separated from capillary blood in a pipette system using the pipette tip for collecting capillary blood according to an exemplary embodiment and a modified exemplary embodiment of the present invention.

Meanwhile, as shown in FIG. 4, in case that the pipette tip 100 for collecting capillary blood according to the modified exemplary embodiment of the present invention includes the filter unit 150 at the first extension end 121 of the sample storage chamber 122, when the handle unit 110 is seated and coupled at the upper part of the pipette tip mounting well 11 in a state in which the capillary blood is stored up to the filter unit 150, the capillary blood is sufficiently moved upward by the plunger 15 formed to protrude from the fixing unit 13 at the lower part of the pipette tip mounting well 11, plasma is separated from the capillary blood by the filter unit 150, and the separated capillary blood is transferred to a pre-treatment solution of another well by using the quantitative syringe 1 of the immunoassay device to mix the sample (plasma) with the pre-treatment solution without separate centrifugal separation to make a mixed solution, and then the mixed solution is sucked again by the quantitative syringe 1 to be dispensed to a desired place.

As shown in FIG. 5A, when the pipette tip 100 for collecting capillary blood according to the exemplary embodiment of the present invention is used, even if the length of the capillary tube 131 is not long, a sufficient amount of capillary blood may be collected into the sample storage chamber 121 extended along the first extension end 122, and when the pipette tip 100 for collecting capillary blood according to the exemplary embodiment of the present invention is mounted in the pipette tip mounting well 11 of the cartridge 10 of the immunoassay device, the plunger 15 integrally protruding from the bottom of the pipette tip mounting well 11 slides upward with respect to the capillary tube 131 and moves the capillary blood in the capillary tube 131 upward to suck a sufficient amount of capillary blood through the quantitative syringe 1*a* and centrifugally separate the capillary blood to use plasma as much as desired, thereby minimizing a sample collection volume error.

In addition, as shown in FIG. 5B, when the pipette tip 100 for collecting capillary blood according to the modified exemplary embodiment of the present invention is used, the capillary blood may be absorbed and stored up to the filter unit 150 installed in the sample storage chamber 121 along the first extension end 122 even if the length of the capillary tube 131 is not long, and when the pipette tip 100 for collecting capillary blood according to the exemplary embodiment of the present invention is mounted in the pipette tip mounting well 11 of the cartridge 10 of the immunoassay device, the plunger 15 integrally protruding from the bottom of the pipette tip mounting well 11 upwardly slides with respect to the capillary tube 131 to press upwardly the capillary blood in the capillary tube 131 to separate the plasma and red blood cells from each other through the filter unit 150, such that the separated plasma in the sample storage chamber 122 of the sample storage unit 120 may be suctioned into the tip 1*a* of the quantitative syringe 1.

The plunger 15 may further include a support plate 13 having a rod shape or a bar shape and having a predetermined load against the bottom of the pipette tip mounting well 11 to support the plunger 15, and the support plate 13 may be fixedly installed to the bottom of the pipette tip mounting well 11 afterwards.

Figure 6:
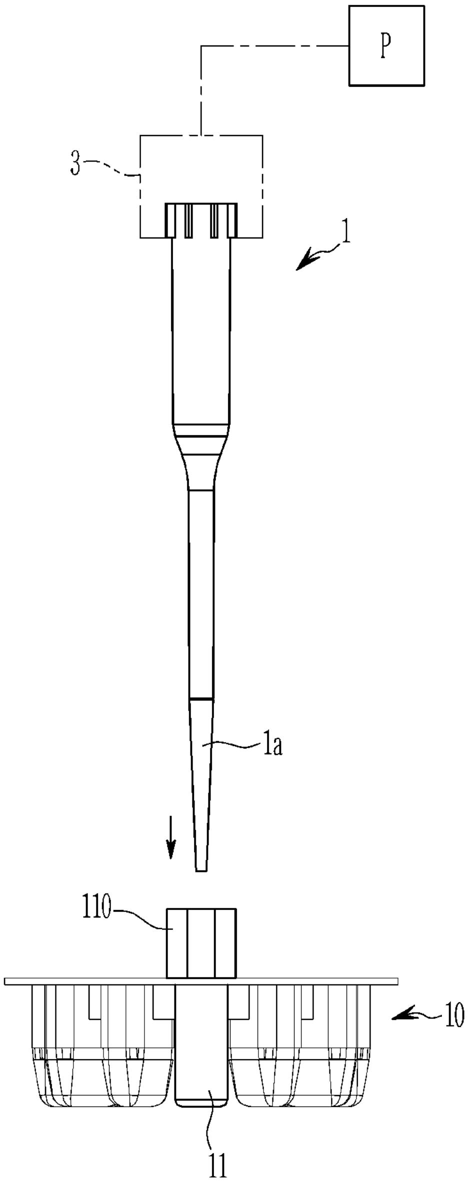
FIG. 6 is a view for explaining a state before a quantitative syringe of an immunoassay device is coupled to a pipette system using a pipette tip for collecting capillary blood according to an exemplary embodiment of the present invention.
Figure 7:
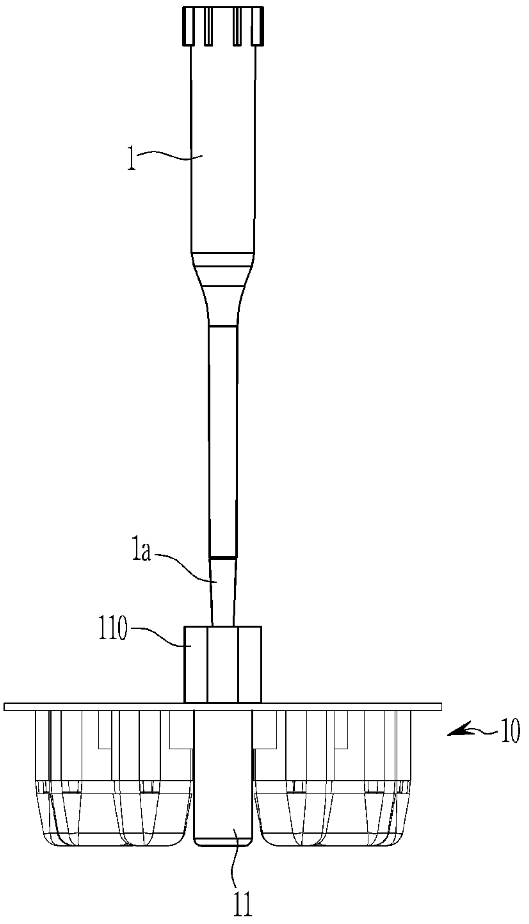
FIG. 7 is a view for explaining a state in which a quantitative syringe of an immunoassay device is coupled to a pipette system using a pipette tip for collecting capillary blood according to an exemplary embodiment of the present invention.

FIG. 6 is a view for explaining a state before a quantitative syringe of an immunoassay device is coupled to a pipette system using a pipette tip for collecting capillary blood according to an exemplary embodiment of the present invention, and FIG. 7 is a view for explaining a state in which a quantitative syringe of an immunoassay device is coupled to a pipette system using a pipette tip for collecting capillary blood according to an exemplary embodiment of the present invention.

As shown in FIGS. 6 and 7, the upper end of the quantitative syringe 1 is connected to a pump P of an immunoassay device through an adapter 3 such as a tube to apply negative pressure when capillary blood is suctioned and positive pressure when the capillary blood is discharged, and the quantitative syringe 1 may be mounted on an XY-axis moving unit and a Z-axis moving unit of the immunoassay device and move up, down, left, and right with respect to at least two wells disposed on an inner circumferential part of the immunoassay cartridge 10.

In particular, it is preferable that the sampling unit 130 and the sample storage unit 120 of the pipette tip 100 are completely accommodated in the pipette tip mounting well 11 of the immunoassay cartridge 10, and only the handle unit 110 is exposed to the inlet of the pipette tip mounting well 11 and is configured to be locked and coupled to the inlet of the pipette tip mounting well 11.

The diameter of the plunger 15 is configured to correspond to the diameter of the capillary tube 131, and it is preferable to have the elastic sheath 15*a* at the upper part so as to be fastened so that there is no gap between the plunger 15 and the capillary tube 131.

Now, a pipette tip and a pipette system for collecting capillary blood according to a modified exemplary embodiment of the present invention will be described with reference to FIGS. 8 to 12.

The pipette tip 100 for collecting capillary blood according to a modified exemplary embodiment of the present invention is the same as the pipette tip 100 for collecting capillary blood according to an exemplary embodiment of the present invention except for including a storage tube 160.

Figure 8:
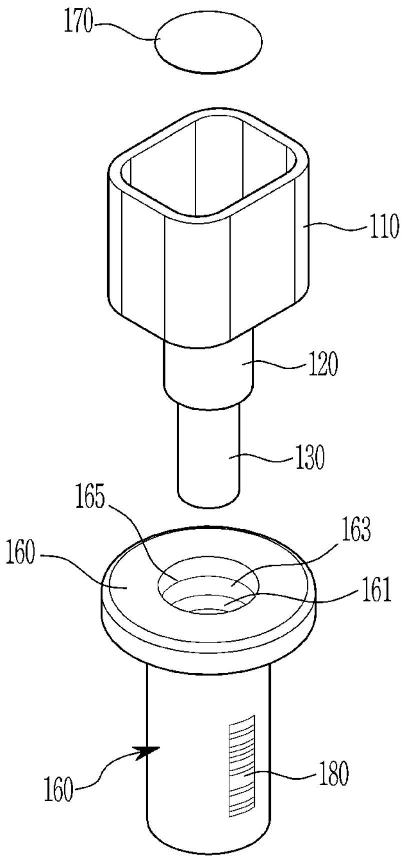
FIG. 8 is a perspective view of a pipette tip for collecting capillary blood according to another embodiment of the present invention.
Figure 9:
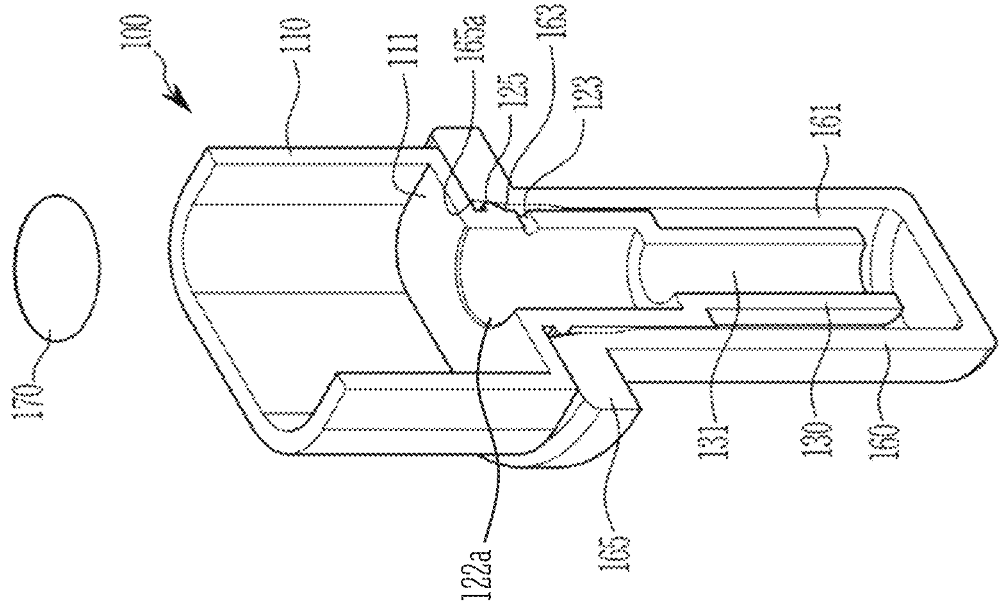
FIG. 9 is a cut-away perspective view of the pipette tip for collecting capillary blood according to another embodiment of the present invention, taken along line II-II.
Figure 10:
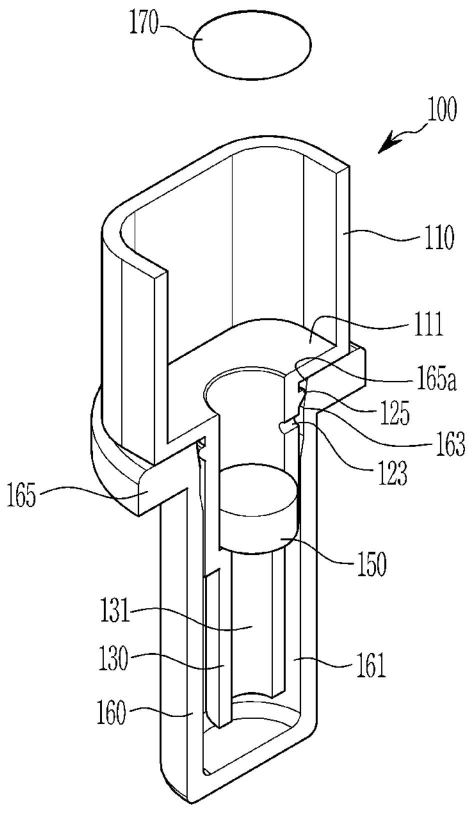
FIG. 10 is a cut-away perspective view of the pipette tip for collecting capillary blood according to a modified exemplary embodiment of the present invention, taken along line II-II.

As shown in FIGS. 8 to 10, the pipette tip 100 for collecting capillary blood according to another embodiment of the present invention further includes a sampling unit 130, and a storage tube 160 accommodating the sample storage unit 120 and locked and coupled to a lower part of the handle unit 110.

The storage tube 160 may include a tube body 161 having one end closed and accommodating the sampling unit 130 and the sample storage unit 120, an inner circumferential insertion-fitting and coupling unit 163 formed at an inner circumferential part of the tube body 161 in order to insertion-fitting couple the tube body 161 to a lower part of the handle unit 110 of the pipette tip 100, and a support flange 165 supporting the second extension end 111 of the handle unit 110.

The tube body 161 has a first jaw 161*a* on which the first extension end 121 of the sampling unit 130 is supported, and when the first extension end 121 is installed on the first jaw 161*a*, the bottom of the tube body 161 may be configured to face the end of the capillary tube 131.

The insertion-fitting and coupling unit 163 may be a coupling groove 165*a* which is insertion-fitting-coupled to the insertion-fitting and coupling protrusion 125 formed on the outer circumference of the sample storage unit 120.

Figure 11:
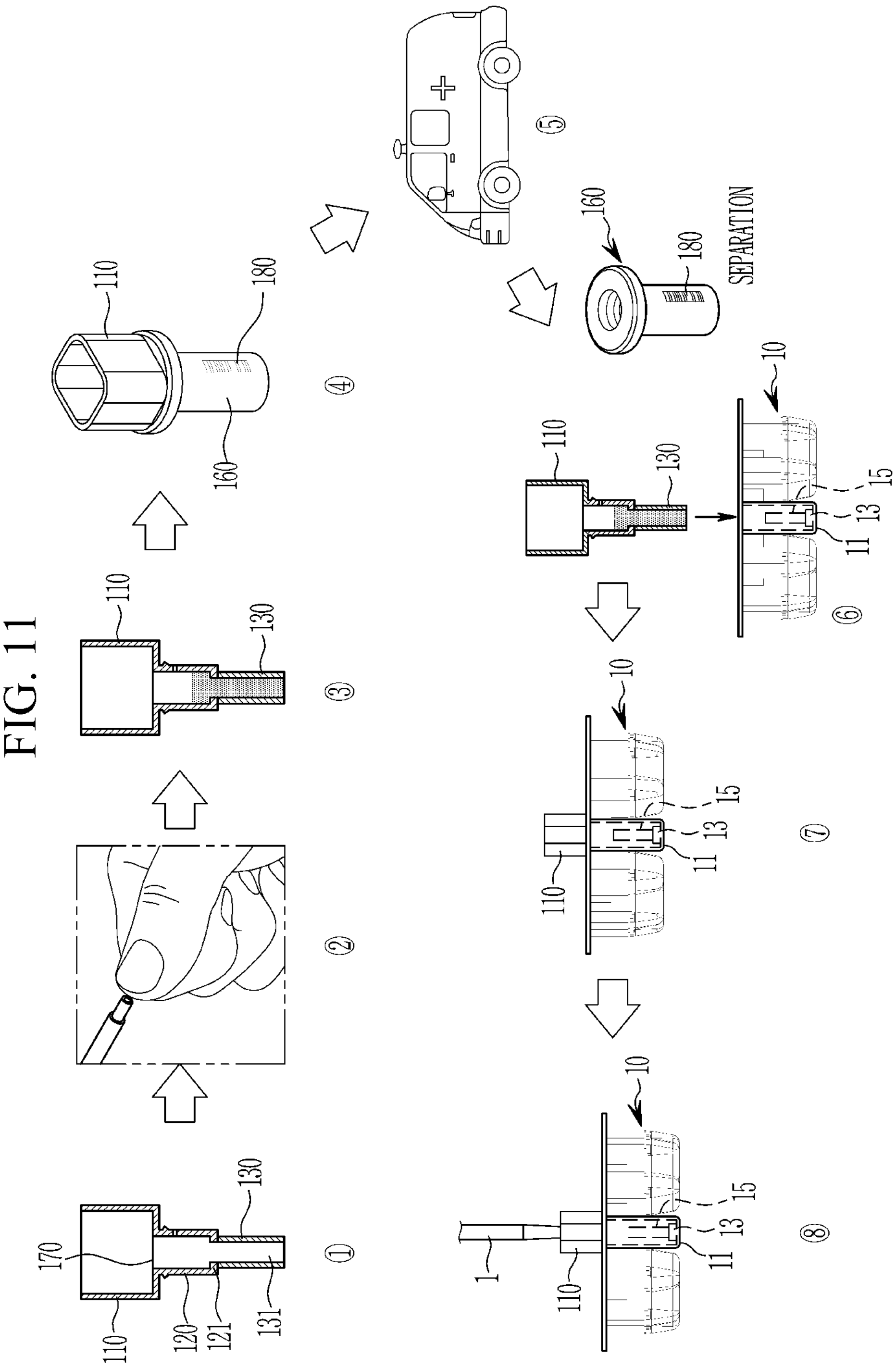
FIG. 11 and FIG. 12 are work flowcharts for describing a pipette system using a pipette tip for collecting capillary blood according to another embodiment of the present invention and a modified exemplary embodiment thereof.

As shown in FIG. 11, the user may fill the capillary tube 131 with the capillary blood by holding the handle unit 110 and pressing the finger punched with a lancet or the like by the sampling unit 130.

The capillary blood may fill the sample storage chamber 121 with a sufficient amount of the capillary blood along the capillary tube 131 along the first extension end 121 by a capillary phenomenon, the sampling unit 130 and the sample storage unit 120 may be accommodated in the storage tube 160 to be locked, and the patient information may be attached to the label unit 180 in the form of a barcode so as to be transferred over a long distance by vehicle or the like.

In the pipette tip 100 for collecting capillary blood according to the modified exemplary embodiment of the present invention, since the upper part of the sample storage unit 120 is blocked by the sealing unit 170 and the lower part thereof is blocked by the storage tube 160, contamination of the surroundings may be prevented even when the sample contains coronavirus or the like.

When the handle unit 110 is seated and coupled at the upper part of the pipette tip mounting well 11 by holding the handle unit 110 of the pipette tip 100 according to the exemplary embodiment of the present invention which is filled with capillary blood after separating the storage tube 160 after being transferred remotely and slowly descending the same in the gravitational direction among the plurality of wells of the circular cartridge 10 to be mounted in the immunoassay device, the capillary blood is sufficiently moved upward by the plunger 15 protruding from the support plate 13 in the lower part of the pipette tip mounting well 11, the quantitative suction is performed using the quantitative syringe 1 of the immunoassay device to perform centrifugation, the centrifuged plasma is transferred to the pre-treatment solution of another well to mix the sample (plasma) with the pre-treatment solution to prepare a mixed solution, and the mixed solution is again sucked with the quantitative syringe 1 to perform the dispensing at the desired position.

Figure 12:
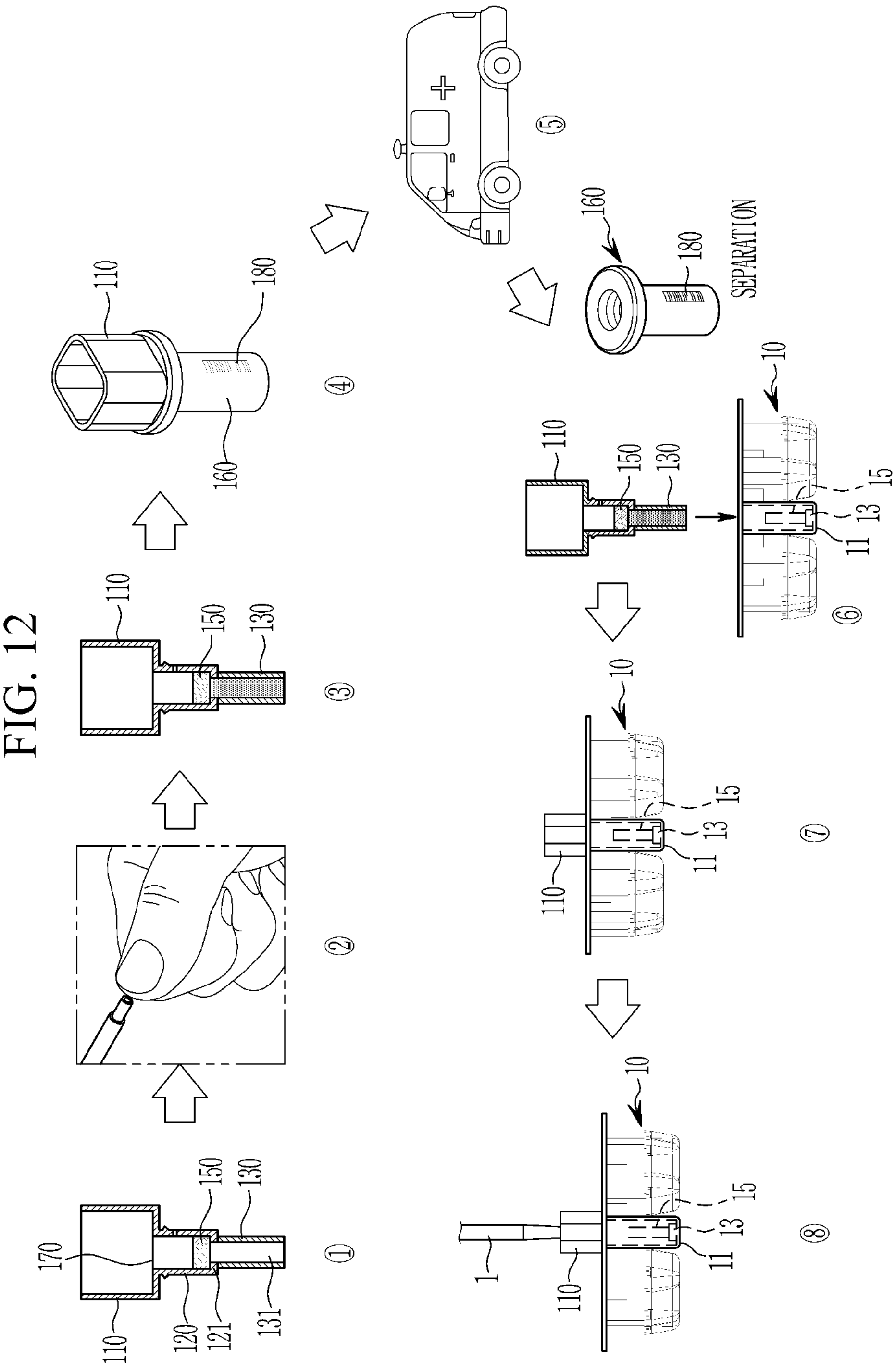
Figure 13:
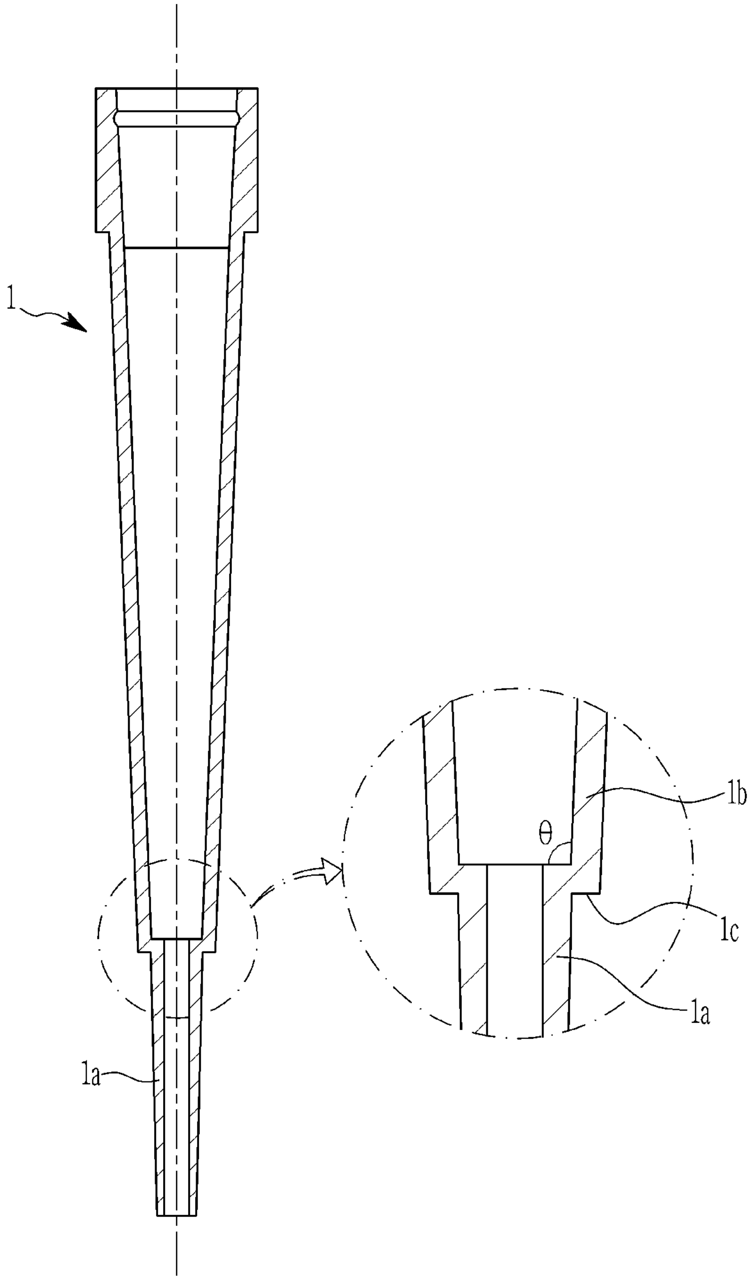
FIG. 13 is a cross-sectional view of a pipette tip for collecting capillary blood according to the prior art.
Figure 14:
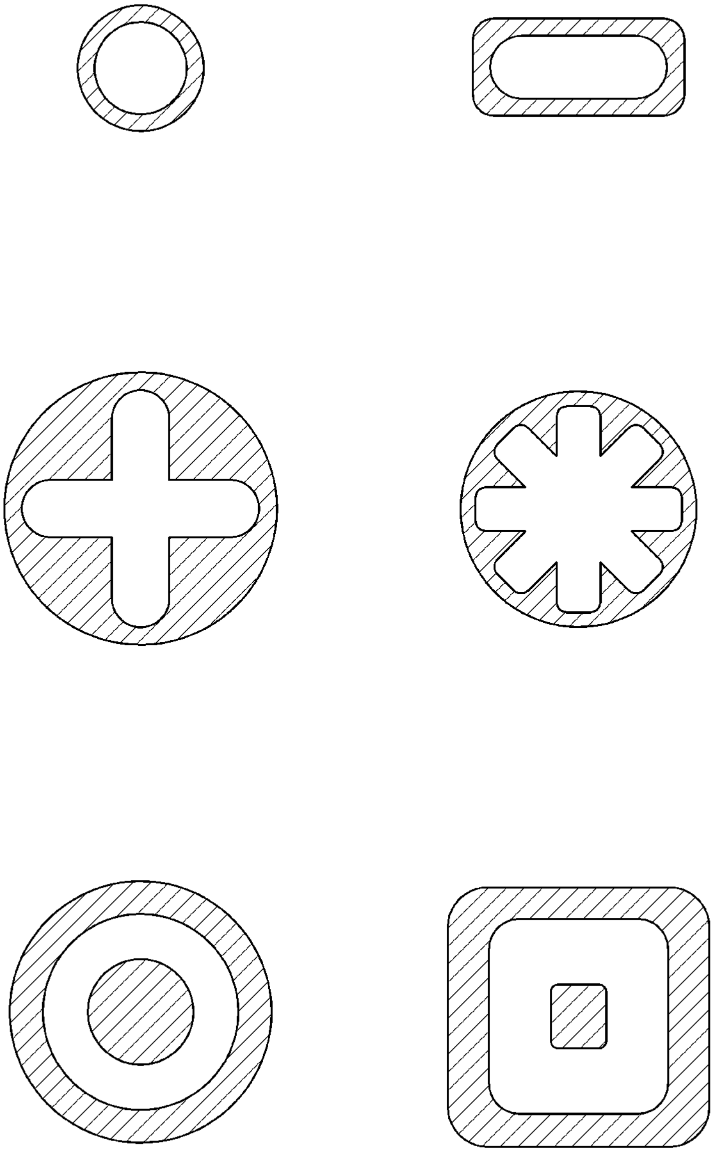
FIG. 14 is a cross-sectional view of the pipette tip end of FIG. 13.

Meanwhile, as shown in FIG. 12, when the pipette tip 100 for collecting capillary blood according to the modified exemplary embodiment of the present invention includes the filter unit 150 at the first extension end 121 of the sample storage chamber 122, the sampling unit 130 and the sample storage unit 120 are accommodated in the storage tube 160 and locked in a state in which the capillary blood is stored up to the filter unit 150, and the patient barcode information is attached in the form of a label 180 so that the patient barcode information may be transferred over a long distance by a vehicle or the like.

In the pipette tip 100 for collecting capillary blood according to the modified exemplary embodiment of the present invention, the upper part of the sample storage unit 120 is blocked by the sealing unit 170 and the lower part thereof is blocked by the storage tube 160, and the storage tube 160 is immediately separated during the immunoassay without centrifugation to perform the immunoassay.

Therefore, as in the case where the sample contains coronavirus, etc. when it should not contaminate the surroundings, provide patient information immediately, and is required to be urgent, the storage tube 160 is very effectively separated, and when the handle unit 110 is coupled to be seated on the top of the pipette tip mounting well 11, the sample is quantitatively suctioned by using the quantitative syringe 1 of the immunoassay device, transferred to a pre-treatment solution of another well without separate centrifugation, mixed with the sample (plasma) and the pre-treatment solution to prepare a mixed solution, and then suctioned again by using the quantitative syringe 1 to be dispensed to a desired place.

INDUSTRIAL APPLICABILITY

As described above, the pipette tip and the pipette system according to an exemplary embodiment or a modified exemplary embodiment of the present invention can secure a sufficient plasma amount required for the immunoassay, can satisfy various collected sample amounts required for the immunoassay with one pipette tip, can reduce an error of the immunoassay by providing a sufficient reaction amount, and can move without contamination for the immunoassay if necessary.

The invention claimed is:

1. A pipette tip for collecting capillary blood, comprising:

a sampling unit having a capillary tube with a first diameter for sampling capillary blood;

a sample storage unit having a first extension end formed from an end of the capillary tube of the sampling unit configured to have a larger cross-sectional area than the sampling unit;

a sealing unit adhered to an upper opening of the sample storage unit and configured to be broken by a syringe inserted through the sealing unit;

a handle unit having a shielding wall attached to and surrounding a circumference of the sealing unit, the handle unit is configured to prevent a sample from splashing from the sample storage unit when the sealing unit is broken by the syringe, and the handle unit is configured to be held by a user for sampling a sample by using the sampling unit; and a filter unit received within a front end of the sample storage unit configured to absorb and store the capillary blood at a first extension end of the sampling unit and configured to separate the capillary blood into red cells and plasma in response to being pressurized through a front end opening of the sampling unit, wherein the sample storage unit is configured to store the plasma, wherein an upper part of the pipette tip is configured to collect plasma from bottom to top in response to pressurization of a plunger through the front end opening of the sampling unit.

2. The pipette tip for collecting capillary blood according to claim 1, wherein the sample storage unit includes:

a tubular body;

an air-discharge hole which is formed on an upper side of the tubular body and from which air is discharged when the sealing unit is broken; and an insertion-fitting and coupling unit for insertion-fitting coupling with respect to a cartridge for immunoassay or a storage tube for accommodating the sampling unit and the sample storage unit along an outer circumferential part of an upper end of the tubular body.

3. The pipette tip for collecting capillary blood according to claim 1 wherein the filter unit includes a porous membrane for separating the red blood cells and the plasma by a pressure equal to or greater than a predetermined pressure, and an upper surface of the filter unit is configured to preclude a sample stored in the sample storage unit from passing through the upper surface under a force of gravity.

4. The pipette tip for collecting capillary blood according to claim 1, wherein the sample storage unit has a second diameter larger than the first diameter of the capillary tube and a length of 50% to 80% of the length of the capillary tube, and the sample storage unit is configured to enable movement of the syringe in the sample storage unit.

5. The pipette tip for collecting capillary blood according to claim 1, wherein the sealing unit is made of aluminum foil and thermally fused to a bottom of the sample storage unit.

6. The pipette tip for collecting capillary blood according to claim 2, further comprising a storage tube, wherein the storage tube includes:

a tube main body having one end blocked, the tube main body sized and configured to receive the sampling unit and the sample storage unit;

an inner circumferential insertion-fitting and coupling unit formed in an inner circumferential part of the tube main body to facilitate insertion-fitting coupling of the tube main body with respect to a part of the handle unit of the pipette tip; and a support flange extending from the tube main body and supporting a second extension end of the handle unit.

7. A capillary blood pipette system, comprising:

a pipette tip for collecting capillary blood including a sampling unit having a capillary tube having a first diameter configured to sample a capillary blood; a sample storage unit having a first extension end formed from a distal end of the capillary tube of the sampling unit configured to have a larger cross-sectional area than the sampling unit; a sealing unit adhered to a distal opening of the sample storage unit and configured to be broken by a syringe inserted through the sealing unit; a shielding wall attached to and surrounding the sealing unit to prevent a sample from splashing from the sample storage unit to the outside when in response to the sealing unit being broken by the quantitative syringe; and a handle unit configured to be which is held by a user to sample using the sampling unit;

an immunoassay cartridge having at least one pipette tip mounting well having a plunger that presses a sample of the sampling unit of the pipette tip from a bottom closed end of the at least one pipette tip mounting well to a top open end of the at least one pipette tip mounting well in response to the pipette tip being coupled to the top;

a syringe configured to quantitatively sample capillary blood collected in an upper part thereof by approaching through the upper part of the pipette tip, in response to the capillary blood from the sampling unit being collected in the upper part by pressurization of the plunger during coupling of the pipette tip to the immunoassay cartridge; and a filter unit received within a front end of the sample storage unit, the filter unit configured to absorb and store the capillary blood along the first extension end of the sampling unit, wherein the filter unit is configured to separate the capillary blood into red blood cells and plasma in response to pressure through a front end opening of the sampling unit, wherein the sample storage unit is configured to store the plasma.

8. The capillary blood pipette system according to claim 7, wherein the sample storage unit includes:

a tubular body;

an air-discharge hole which is formed on an upper side of the tubular body and from which air is discharged when the sealing unit is broken; and an insertion-fitting and coupling unit for insertion-fitting coupling with respect to the immunoassay cartridge for immunoassay or a storage tube for accommodating the sampling unit and the sample storage unit along an outer circumferential part of an upper end of the tubular body.

9. The capillary blood pipette system according to claim 7, wherein the filter unit includes a porous membrane for separating the red blood cells and the plasma by a pressure equal to or greater than a predetermined pressure, and an upper surface of the filter unit is configured to preclude a sample stored in the sample storage unit from passing through the upper surface under a force of gravity.

10. The capillary blood pipette system according to claim 7, wherein the sample storage unit has a second diameter larger than the first diameter of the capillary tube and a length of 50% to 0% of the length of the capillary tube, and the sample storage unit is configured to enable movement of the syringe in the storage unit.

11. The capillary blood pipette system according to claim 7, wherein the sealing unit is made of aluminum foil and thermally fused to a bottom of the sample storage unit.

12. The capillary blood pipette system according to claim 8, further comprising a storage tube, wherein the storage tube includes:

a tube main body having one end blocked, the tube main body sized and configured to receive the sampling unit and the sample storage unit;

an inner circumferential coupling unit formed in an inner circumferential part of the tube main body to facilitate insertion-fitting coupling of the tube main body with respect to a lower part of the handle unit of the pipette tip; and a support flange extending from the tube main body and supporting a second extension end of the handle unit.

13. The capillary blood pipette system according to claim 12, wherein the storage tube includes a label unit provided on an outer wall of the tube main body of the storage tube, the label unit displaying patient information in a form of a barcode.

14. The capillary blood pipette system according to claim 7, wherein the plunger protrudes from a bottom of the at least one pipette tip mounting well in a form of a bar or a rod.

15. The capillary blood pipette system according to claim 7, wherein the plunger includes a bar or a rod and a support plate formed at a lower part of the bar or the rod, the plunger is detachably installed at a bottom of the at least one pipette tip mounting well.

* * * * *